United States Patent [19]

Wilje

[11] 4,105,927
[45] Aug. 8, 1978

[54] DEVICE FOR ADJUSTING THE LEVEL OF BRIGHTNESS EMITTED BY A LAMP

[76] Inventor: Oscar Wilje, Sturegatan 44, 791 00 Falun, Sweden

[21] Appl. No.: 679,779

[22] Filed: Apr. 23, 1976

[30] Foreign Application Priority Data

Apr. 24, 1975 [SE] Sweden ............................ 7504725

[51] Int. Cl.² ............................................. B60Q 1/02
[52] U.S. Cl. ............................................. 315/82; 315/83
[58] Field of Search ................... 315/82, 83, 77, 78, 315/80

[56] References Cited

U.S. PATENT DOCUMENTS

| 2,786,963 | 3/1957  | Vogt .......................... 315/83 |
| 3,121,823 | 2/1964  | Brock et al. .................. 315/82 X |
| 3,355,624 | 11/1967 | Guyton et al. ................. 315/83 |
| 3,546,527 | 12/1970 | Chunn et al. .................. 315/83 |
| 3,689,806 | 9/1972  | Saita .......................... 315/82 |

*Primary Examiner*—Saxfield Chatmon, Jr.

*Attorney, Agent, or Firm*—Burns, Doane, Swecker & Mathis

[57] ABSTRACT

A device for adjusting the level of brightness of a lamp, especially the headlight lamp in a head lamp device or assembly of a vehicle including said headlight lamp and a dimlight lamp. The device includes a switching arrangement to feed current either to said headlight lamp or to said dimlight lamp.

An electronic device, connected to said headlight lamp, includes an electric energy storing apparatus which is connected to be fed by current during such an activation of the switching arrangement that said arrangement feeds current to the headlight lamp.

When the switching arrangement thereafter is activated to feed current to the dimlight lamp, the storing apparatus is discharged and feeds a decreased current or voltage, which by electronic means control the current and causes the headlight lamp to reduce its level of brightness.

8 Claims, 3 Drawing Figures

DEVICE FOR ADJUSTING THE LEVEL OF BRIGHTNESS EMITTED BY A LAMP

FIELD OF THE PRESENT INVENTION

The present invention relates to a device for adjusting the level of brightness or the magnitude of luminuos flux emitted by a lamp so that when the feed circuit for said lamp is switched off the level of brightness will decrease slowly. The time spent to reduce the level from its highest magnitude to its lowest magnitude can vary; but should be adjusted to between 2-10 seconds.

The present invention gives a special approach to vehicles where it is used together with a headlight lamp incorporated in a head lamp device or assembly which includes the headlight lamp and a dimlight lamp.

BRIEF DESCRIPTION OF THE PRIOR ART

It is customary that, when two motor driven vehicles meet on a road during darkness, the drivers usually switch from bright headlights to dimlights in order to eliminate glare. This switching from the bright headlight to the less intense dimlight takes place immediately, but the eyes are not able to adapt themselves to this fast change. Moreover the dimlight produces a different light pattern on the road than that produced by the headlight. These two circumstances affect the driver in such a way that he is unable for some seconds to evaluate situations occurring on the road in front of the vehicle.

OBJECTS OF THE PRESENT INVENTION

The object of the present invention is to eliminate the above mentioned drawback in previously known head lamp devices. The invention has as its main object to cause a smooth transition from headlight to dimlight and to cause the light pattern to change gradually rather than immediately. The object is to give the eyes an opportunity to adapt themselves to the change and thereby permit a better opportunity to evaluate the situations occurring on the road during the meeting of the vehicles.

This object has been achived by coupling an electronic device (transistor device) in parallel or in series with the headlight lamp. This device is constructed for indivual adjustment, depending upon the sensitivity of the eyes of the driver.

A further object of the present invention is to cause the changing headlight flux to change in such a way that a first portion of the total changing time takes place instantaneously or immediately to a predetermined magnitude and that during the succeeding portion of the total changing time, the magnitude changes gradually.

A still further object is to provide a device for adjusting the level of brightness or the magnitude of luminous flux emitted by a lamp, especially the headlight lamp in the head lamp assembly of a vehicle including said headlight lamp and a dimlight lamp. The device comprises a switching arrangement to supply current to the headlight lamp or to the dimlight lamp. The electronic device is connected to the headlight lamp. This electronic device includes an electric energy storing apparatus, which is so connected to be supplied with current during such an activation of the switching arrangement, that the arrangement supplies current to the dimlight lamp. When the switching arrangement thereafter is activated to supply current to the dimlight lamp, said storing apparatus is discharged and supplies a decreasing current or voltage which, by electronic means, controls the current, and activates the headlight lamp to reduce the level of brightness from intense light to a less intense light by changing the brightness of the headlight lamp from its intense luminous flux to darkness.

BRIEF DESCRIPTION OF THE DRAWINGS

Three embodiments having the novel features of the present invention will be described with reference to the attached drawing in which.

DESCRIPTION OF THE PREFERRED EMBODIMENTS

Figures 1, 2, 3:
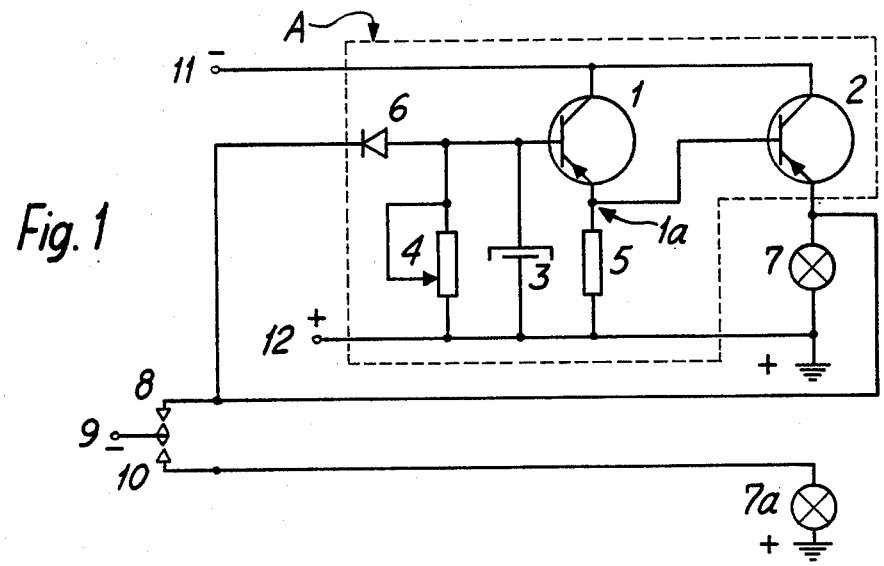
FIG. 1 shows an electric circuit of a first embodiment connected in parallel with the headlight lamp.
FIG. 2 shows part of an electric circuit of a second embodiment also connected in parallel with the headlight lamp and, FIG. 3 shows an electric circuit of a third embodiment connected in series with the headlight lamp.

The present invention relates to a device for adjusting the level of brightness or the magnitude of luminous flux emitted by a lamp, especially the headlight lamp in a head lamp assembly of a vehicle including said headlight lamp and a dimlight lamp which comprises a switching arrangement to feed current either to the headlight lamp or to the dimlight lamp. An electronic device is connected to the headlight lamp, which device includes an electrical energy storing means that is fed by current during activation of the switching arrangement to feed current to the headlight lamp. When the switching arrangement is activated to feed current to the dimlight lamp, the storing means is discharged and supplies a decreasing current or voltage, which activates the headlight lamp to reduce its level of brightness from intense light to a less intense light by changing the brightness of the headlight lamp from its high luminous flux to darkness.

It should be noted that, to simplify the drawings, neither the vehicle nor the battery or other parts of the conventional electrical system required for the functioning of the vehicle are shown.

FIG. 1 shows a device for adjusting the level of brightness connected in parallel with the headlight lamp. The invention, illustrated by the electronic device "A" enclosed by the broken lines, includes a transistor coupling.

The transistor coupling according to the invention in the embodiment of FIG. 1, consists of a first transistor 1, the collector of which is connected to one pole 11 of a direct current source (second potential). The base of transistor 1 is connected to one end of a resistance 4 connected in parallel with a capacitor 3 partly to one end of an electrical valve or diode 6, the other end of the diode being connected to contact means 8 in switching arrangement 9, by means of which the headlight lamp can be switched on and off. As seen from FIG. 1, a capacitor 3 and a resistance 4 are each connected in parallel to the base of transistor 1 between the latter and the diode 6 while, at their other ends, they are connected to the other pole 12 of the direct current source. The emitter of the first transistor 1 is connected to a pole 12 through a second resistance 5 and also to the base of the second transistor 2. The collector of transistor 2 is also connected to the pole 11. The lamp or the lamps 7, whose luminous flux is to be adjusted, is connected between the emitter of the second transistor 2, the contact means 8 in the switching arrangement 9, and the second pole 12. The couplings of the dimlight lamps 7a are unchanged and these are connected to the contact means 10 in the switching arrangement 9 and the first potential.

The circuit of FIG. 1 is illustrated under the assumption that the negative pole of the source corresponds to pole 11, while the positive pole corresponds to pole 12. Transistors of pnp-type have been used. If the polarities are changed it would be obvious to change pnp-type transistors to npn-type transistors and to reverse the connections of the diode and electrolytic capacitor.

The device functions as follows: When the headlight lamp 7 is switched on because the contact means 8 in the switching arrangement 9 is connected to the potential equal to pole 11, the capacitor 3 is charged. This capacitor may be an electrolytic condenser. As fast as the means 8 is switched off and the means 10 is connected to the source, the dimlight lamp 7a immediately emits its full luminous flux. At the same time, capacitor 3 is discharged through resistance 4. This means that the potential at connecting point 1a goes slowly towards the potential of pole 12. During this time, which may be any value between 2-20 seconds, preferably between 5-15 or, more preferably about 10 seconds, depending upon the values of resistor 4 and capacitor 3, the transistor 2 is controlled to feed a decreasing current to the lamp 7 and thus cause the luminous flux to decrease. The luminous flux from lamp 7 is reduced in an initial portion of the total discharge time, but is reduced still more during a second time portion until capacitor 3 is completely discharged, causing the headlight lamp to go out completely.

It will be appreciated that the transistor 1 requires a forward bias in order to conduct. Therefore removal of the forward bias renders the transistor 1 non-conductive. The capacitor 3 is charged to the approximate value of the negative potential at terminal 9 when terminal 9 is connected to terminal 8. When the switch contact 8 is opened, i.e. terminal 9 is connected to contact 10, the low beam light 7a is energized and transistor 2 will conduct. Conduction of transistor 2 will cause a negative potential to be placed on the cathode of diode 6. This negative potential will be less than the negative potential on capacitor 3 (on the anode of the diode 6), or at least insufficient to cause conduction of diode 6, because of the potential drop across transistor 2 and the required forward bias voltage of diode 6 (and any semiconductor diode). Thus, the base potential of the transistor 1 will be controlled by the capacitor 3 discharging through the resistor 4 (which results in a base potential that decreases as a function of time as described above).

As the capacitor 3 discharges, the conduction of both transistor 1 and 2 decreases (i.e. the conduction of transistor 1 decreases, decreasing the conduction of transistor 2). The potential across the lamp 7 thus decreases as well as the negative potential applied to the cathode of diode 6. Diode 6 therefore remains non-conductive even as capacitor 3 discharges. Capacitor 3 therefore continues to control the conduction of transistor 1 (which controls transistor 2) whenever the switching arrangement is such that terminal 9 is connected to terminal 10 (and terminal 8 is open). Eventually, capacitor 3 is discharged to such a point that the transistor 1 is no longer forward biased and is thus non-conductive. Of course, at this same time transistor 2 is non-conductive and the light 7 is fully off.

The variation in the luminous flux and the discharge time after switching depend, as mentioned before, upon the size of capacitor 3 and resistance 4. The latter may be of a fixed value or adjustable to any proper value. The combination of capacitor 3 with resistance is such that the total flux immediately after switching eliminates glare. The combined light pattern from the dimlight lamp and the reduced flux from the headlight lamp is immediately, or after the first second after the switching operation, essentially the same as produced by the headlight alone.

The circuit shown in FIG. 1 may adjust the fluxes from a plurality of lamps simultaneously and in the same manner. By supplying each headlamp with a separate device it is possible to adjust each lamp independently in such a way that the flux from one lamp is reduced faster than that of another lamp. The device is not restricted to be used in vehicles, but may be used in other applications.

FIG. 2 shows a circuit diagram of a second embodiment in which the change is made in such a way that during a first portion of the total changing time the change takes place instantaneously to a predetermined magnitude and during the following second portion of the total changing time, the change takes place gradually.

It should be noted that the first time portion is very short compared to the second time portion. In fact, the first portion can be considered instantaneous.

In order to achieve such a change it might be sufficient to connect a predetermined resistance value into the circuit shown in FIG. 1, but such a circuit does not provide sufficient accuracy due to generator charging capacity, heat and other curcumstances.

In order to overcome these difficulties, a current reducing arrangement "B" is used having a Zener-diode 13, by which it is possible to reduce the current or voltage to a value about 25% of that without the Zener-diode. By using another Zener-diode, this value will change even more.

Zener-diode 13 is connected between the base of transistor 1 and pole 12. Zener-diode 13 is selected so that the discharge of capacitor 3 will start a predetermined low value. As a protection for transistor 1, a diode 14 and a resistance 15 are connected in series between the capacitor 3 and the base of transistor 1.

It should be mentioned that the resistance 4 and the capacitor 3 cooperates in order to set the total time spent to reduce the luminous flux value or the level from its highest magnitude to its lowest magnitude. These may be selected so the total time will fall within the range 1-30 seconds. Practical tests show that 2-20 seconds is a usable range in most applications. In fact 8-12 seconds has been found most convenient.

FIG. 3 shows an electric circuit of a third embodiment connected in series with the headlight lamp 7. It should be noted that only transistor 2 is connected in series with the lamp 7 and the rest of the electronic circuit is connected in parallel.

It will be readily understood by those skilled in the art that the present invention includes circuits other than the preferred embodiments described above and that the scope of the invention is not limited to the preferred embodiment illustrated, except as defined in the appended claims.

What I claim is:

1. A device for causing the brightness of a headlight lamp in a headlamp assembly of a vehicle to diminish gradually during the simultaneous switching from headlight to dimlight, said device comprising:
(a) a headlight and a dimlight;
(b) switching means connected to said headlight and to said dimlight to supply current to said dimlight or to said headlight by alternately connecting said dimlight and said headlight to an electrical potential source; and
(c) control means connected to said headlight and dimlight for causing the brightness of said headlight to diminish gradually upon connection of said potential source by said switching means from headlight to dimlight, said control means comprising:
  (i) a first transistor having its base connected to storage means for storing electrical energy,
  (ii) said switching means being arranged to also supply current to said storage means when supplying current to said headlight, and
  (iii) a second transistor connected in series with said headlight for controlling the current flowing through said headlight, the conduction of said second transistor being controlled by said first transistor, said storage means discharging a gradually diminishing current to gradually diminish conduction of said first transistor and to decrease the level of brightness of said headlight when said switching means is activated to supply current to said dimlight.

2. A device according to claim 1 wherein the storage means comprises a capacitor and wherein the base of the first transistor is connected through a diode and said switching means to a first potential and is connected to a second potential through a first resistance, which is in parallel with said capacitor.

3. A device according to claim 2 wherein the first transistor is connected to the second potential through a second resistance, the second transistor being connected between the first potential and the headlight and the base of the second transistor being connected to the connection point of the first transistor and the second resistance so that a signal developed on the second resistance by the first transistor controls the conduction of the second transistor.

4. A device according to claim 2, wherein the first resistance is adjustable.

5. A device according to claim 2, wherein the capacitor consists of an electrolytic capacitor.

6. A device according to claim 1 wherein the base of the first transistor is connected through a diode and a resistance to a first potential of the potential source.

7. A device according to claim 1, wherein a Zener-diode is connected between the base of the first transistor and the second potential.

8. A device according to claim 1, wherein said control means is connected in parallel to said headlight lamp.

* * * * *